(12) United States Patent
Thomas

(10) Patent No.: US 7,058,669 B2
(45) Date of Patent: Jun. 6, 2006

(54) NON-ZERO NULL REFERENCE TO SPEED UP WRITE BARRIER CHECKING FOR GARBAGE COLLECTION

(75) Inventor: Stephen Thomas, High Wycombe (GB)

(73) Assignee: Esmertec AG, Dubendorf (CH)

( * ) Notice: Subject to any disclaimer, the term of this patent is extended or adjusted under 35 U.S.C. 154(b) by 402 days.

(21) Appl. No.: 10/203,060

(22) PCT Filed: Feb. 7, 2001

(86) PCT No.: PCT/IB01/00456

§ 371 (c)(1),
(2), (4) Date: Mar. 24, 2003

(87) PCT Pub. No.: WO01/57674

PCT Pub. Date: Aug. 9, 2001

(65) Prior Publication Data

US 2003/0169920 A1 Sep. 11, 2003

Related U.S. Application Data

(60) Provisional application No. 60/180,643, filed on Feb. 7, 2000.

(51) Int. Cl.
*G06F 17/30* (2006.01)

(52) U.S. Cl. ........................ 707/206; 707/200

(58) Field of Classification Search ................ 702/206, 702/200
See application file for complete search history.

(56) References Cited

U.S. PATENT DOCUMENTS 6,094,664 A * 7/2000 Ungar ................ 707/206

FOREIGN PATENT DOCUMENTS

EP 0604010 A1 6/1994
EP 0881577 A1 12/1998

OTHER PUBLICATIONS

R. Jones et al., "Garbage Collection: Algorithms for Automatic Dynamic Memory Management", pp. 183–200, Chichester, Wiley, GB.

* cited by examiner

*Primary Examiner*—Jack A. Lane
(74) *Attorney, Agent, or Firm*—Caesar, Rivise, Bernstein, Cohen & Pokotilow, Ltd.

(57) ABSTRACT

A method and system of increasing the speed of a write barrier check. Instead of using zero null references, in one embodiment of the invention a special object is created at a valid and globally accessible location in memory. The special object is colored black, and the valid location of the special object is used in objects linked lists, and other elements whenever a null value is required. Preferably, the special object is colored black by coloring a bit pattern in a header of the special object to represent black.

15 Claims, 3 Drawing Sheets

Fig. 4
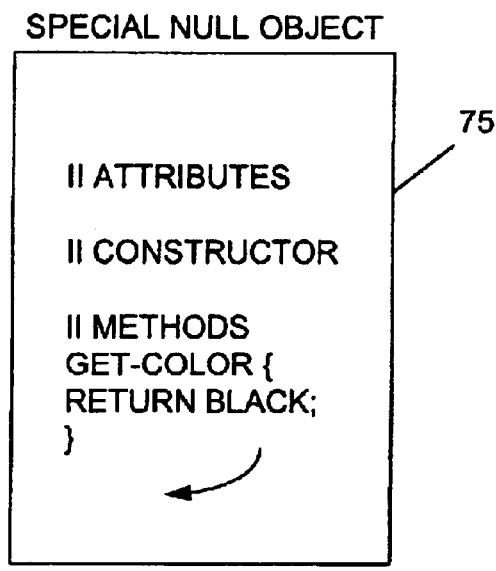
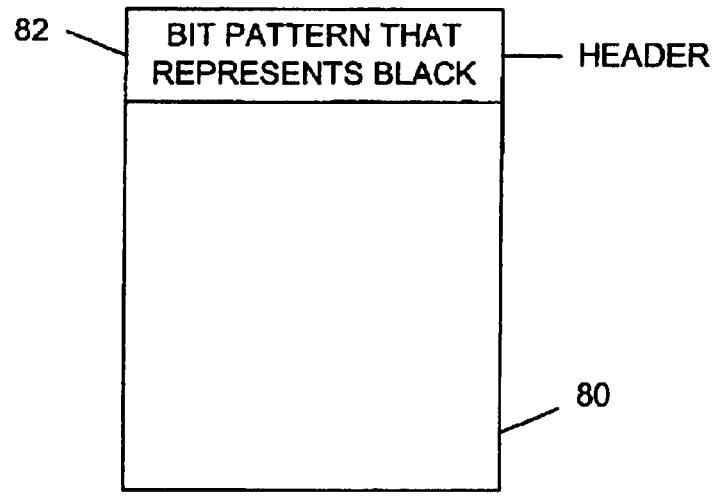
Fig. 5

NON-ZERO NULL REFERENCE TO SPEED UP WRITE BARRIER CHECKING FOR GARBAGE COLLECTION

This application claims the benefit of provisional application Ser. No. 60/180,643 filed Feb. 17, 2000.

BACKGROUND OF THE INVENTION

The present invention relates to memory management. More specifically, the invention relates to automatic reclamation of memory occupied by program segments that are no longer active, commonly referred to as garbage collection.

The execution or running of a computer program causes certain areas of memory to be assigned values. For example, whenever a variable is declared, a certain area of memory having a certain address is set aside to store the value associated with that variable. It is difficult to predict how much memory an application program will require (conditions can vary each time the application is run). Thus, computing environments are designed with tools to handle the changing memory requirements of application programs.

In general, application memory management combines two related tasks: allocation and recycling. Allocation occurs when the program requests a block of memory (e.g., when a variable is declared or an object is created). When a request is made, the memory manager must allocate that block of memory out of the larger block of memory it has received from the operating system. The tool that performs this task is known as the "allocator." Recycling involves reusing memory blocks that contain data that is no longer required by the program. There are two approaches to recycling memory: manual memory management, where the programmer decides when memory can be reused, and automatic memory management, where a software routine reclaims memory on its own.

The basic problem in managing memory is knowing when to keep the data stored in the memory and when to throw it away, so that the memory can be reused. Conceptually, proper memory management should be easy. However, it is difficult to achieve in practice. Furthermore, poor memory management can affect the robustness and speed of programs.

Programming languages designed with automatic memory management use specialized routines (typically called "garbage collectors") that search the memory used by a program for program segments (e.g., objects, methods, etc.) that are no longer active. Upon finding an inactive segment the routine reclaims the memory for re-use. A common garbage collection technique involves following references to determine which blocks of memory are reachable from program variables. Automatic memory managers that use this technique are called "tracing collectors." Tracing collectors often implement a mark-and-sweep strategy. First, the collector examines the program variables or, more broadly, objects and determines all blocks of memory that are referred to by those objects. These blocks are added to a list of blocks that will be further examined. For each block on the list, the collector sets a flag on the block (or marks the block) to show that it is still required and that it has been examined. The collector also adds any blocks pointed to by the block being examined that have not been marked to the list of blocks to be examined. The collector then sweeps the allocated memory and returns any blocks that have not been marked to the allocator for reuse.

Mark-and-sweep garbage collection can be implemented using a three-color marking system. Initially all objects are assumed live and colored white. Every object that can be reached during the tracing process is marked gray. Then the gray objects are processed in an iterative fashion. While there are still gray objects, one of the gray objects is chosen, it is colored black, and then all of the objects that can be reached from that gray object, if they are not already gray or black, are colored gray. Another gray object is chosen and the process is continued until there are no more gray objects. When the process is complete, all live objects are colored black, and all other objects are white.

SUMMARY OF THE INVENTION

While presently available garbage collection routines are functional, they are not useful for all situations and computing environments. They also suffer from several deficiencies. One shortcoming of current tracing collectors relates to the errors that arise when these routines encounter null references. In Java and other languages, the null reference value is not specifically and rigidly defined, meaning that a number of different values can be used to represent null. One traditional way of representing the null reference value is to use a bit pattern of all zeros, i.e., numerical zero. The problem with this is that references are normally treated as addresses, and the memory at a reference address contains the object's contents. Furthermore, most computing platforms are designed such that any attempt to access memory at or near address zero causes an error. Generally, addresses are considered to have non-zero values. As a consequence, any code or routine that manipulates references, such as a garbage collector, must make frequent checks to avoid de-referencing a null value.

Programs that run in conjunction with concurrent garbage collectors are further complicated by the fact they must interact with the garbage collector whenever they update, or overwrite, the contents of one object with a reference to another object. Specifically, they must check if a reference to a white object is being written into a black object, and if so undertake some special action, typically marking either the white object or the black object gray. This check is known as a write barrier and is usually done using an implementation of the pseudo code below:

```
barrier(o1, o2) {
    if(o2 is null)
        return;
    if(color(o1) == black && color(o2) == white)
        barriertrap(o1, o2)
}
```

The inventor has found that the typical write barrier check may be improved by creating a pseudo or special object at a valid, well-known location in memory, instead of using zero for the null value. The special object has a constant color, black. Whenever a null value is required, the special object is used. When the special object is used the barrier checking code is simplified to:

```
barrier(o1, o2) {
    if(color(o1) == black && color(o2) == white)
        barriertrap(o1, o2)
}
```

In addition to simplifying the write barrier, the special object technique can be extended to other uses. When dispatching via an object (that is, calling a subprogram which has various implementations depending on the specific type of the object), a check has to be made that the program is not attempting to dispatch via a null object reference, and a run time error raised if such an attempt is made. Such dispatching subprogram calls are very frequent in object-orientated programs. However, if the special null object has a valid dispatch table (that is, an index of the specific subprogram implementations appropriate to the object's type), and every entry in the table refers to a subprogram that merely raises the run time error unconditionally, then all the null object checks can be removed completely from dispatching subprogram calls while still having a run time error raised if an illegal dispatching call does occur.

As is apparent from the above, it is an advantage of the invention to provide a method and system of improving write barrier checking in garbage collection and dispatching. Other features and advantages of the present invention will become apparent by consideration of the detailed description and accompanying drawings.

BRIEF DESCRIPTION OF THE DRAWINGS

FIG. 4 is a schematic diagram of a special null object.

FIG. 5 is a schematic diagram of another embodiment of a special null object.

DETAILED DESCRIPTION

Figure 1:
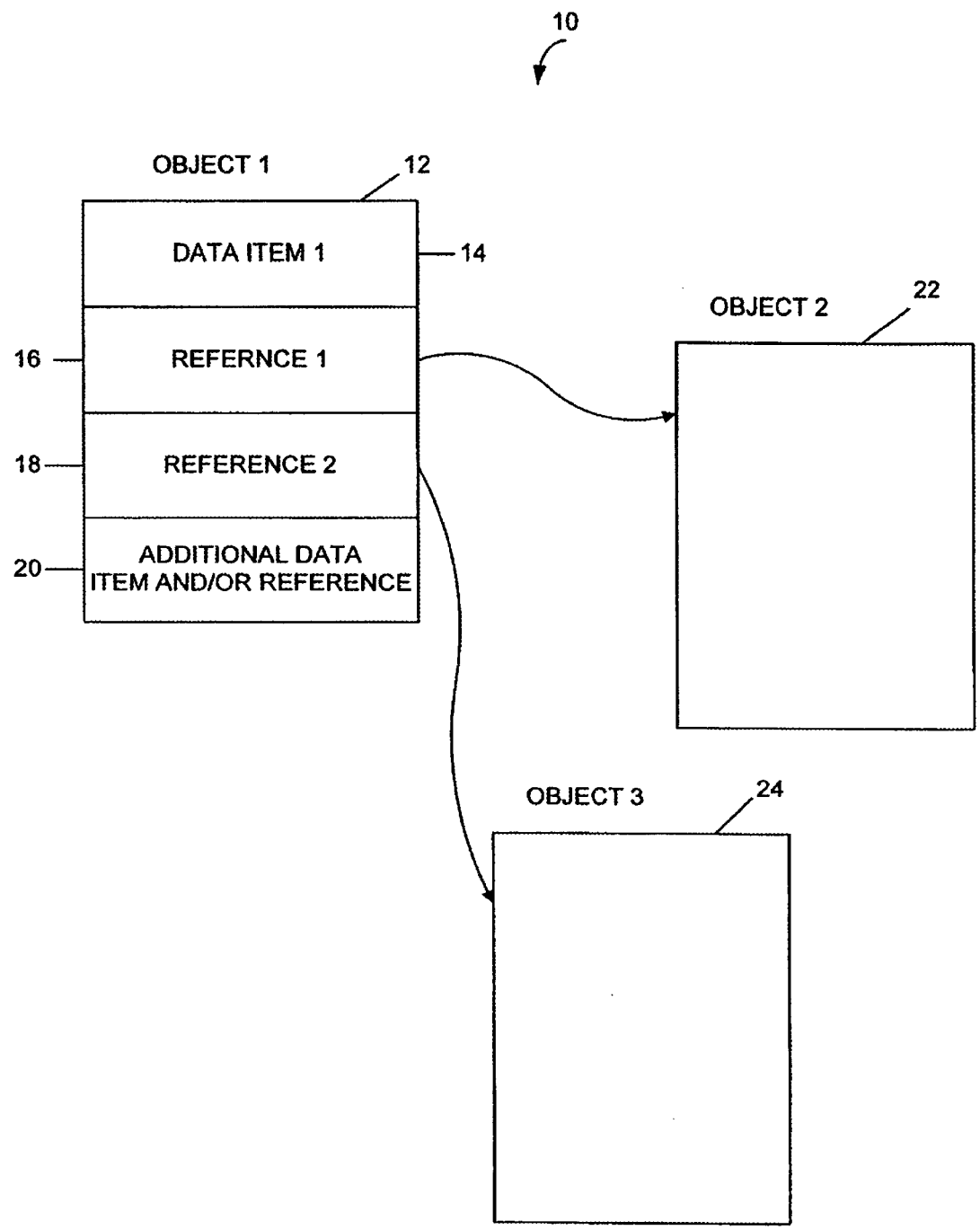
FIG. 1 is a schematic diagram of memory in a computing environment illustrating one object referring to other objects.

Before embodiments of the invention are explained, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting. The following description assumes that the reader is familiar with computer science and has a working knowledge of memory management, and assembly programming languages, as one of ordinary skill in the art would possess.

Figure 3:
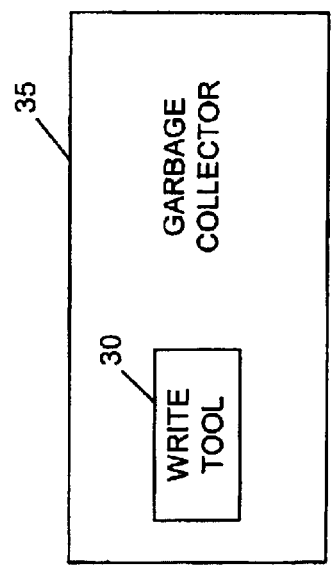
FIG. 3 is a schematic diagram of a garbage collector with a write tool.

FIG. 1 illustrates a group 10 of objects as might be configured in a computing environment where garbage collection is implemented using a write barrier. The group 10 includes a first object 12 with various items such as references and data items. For purposes of illustration, object 12 is shown with a first data item 14, a first reference 16, a second reference 18, and an additional data item or reference 20. The first reference 16 refers to a second object 22 and the second reference 18 refers to a third object 24. The tool used to assign the references 18 and 20 to the objects 22 and 24 is, broadly speaking, a write tool 30 (shown schematically in FIG. 3) of a garbage collector 35. In addition to assigning references, the write tool 30 may check what kind of objects are being referred to. For garbage collection, the write tool may also check the color of the objects, which is also known as a "write barrier check." Conducting such a check helps ensure that information is not lost on subsequent garbage collections due to an erroneous identification of an object as inactive, when the object is, in fact, active.

It should be noted that for purposes of illustration the write tool 30 is shown as part of the garbage collector 30. However, the write tool 30 could be implemented as a stand alone module or as part of another element in a computing environment.

The reference assignment and checking conducted by the write tool 30 must account for the fact that there are two basic kinds of references. There is a reference to an object and there is the null reference. The null reference is just a single value (often zero) that is used to indicate that there is no reference at a particular point in memory. This is best understood by reference to FIG. 2.

Figure 2:
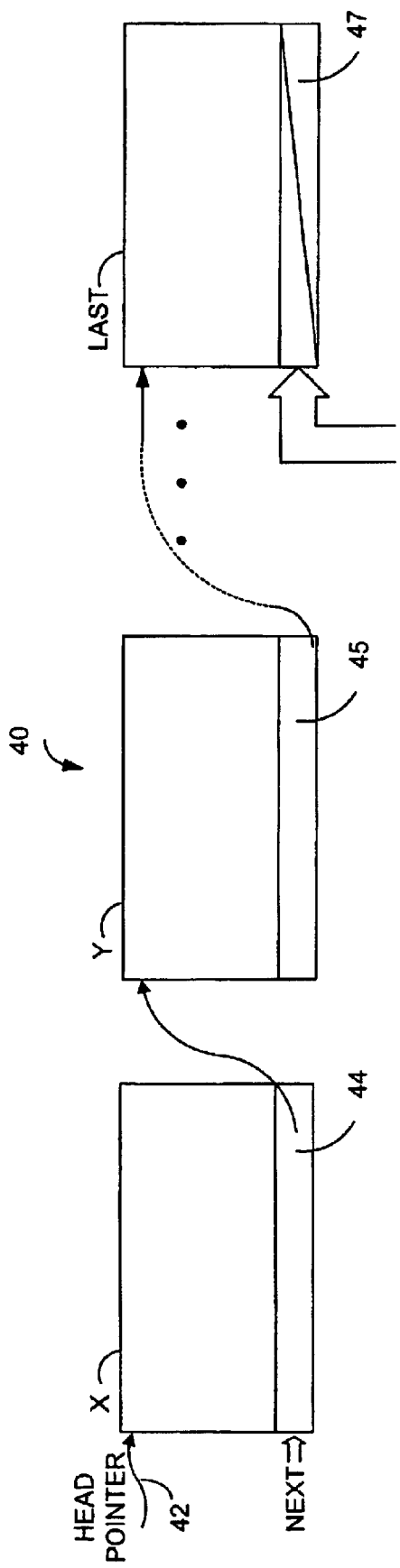
FIG. 2 is a schematic diagram of a linked list of objects.

FIG. 2 illustrates a linked list 40 of objects. The linked list 40 includes an object X referenced by a head pointer 42. Object X includes a field 44 named "NEXT" which refers to an object Y, the next object in the linked list of objects 40. Object Y includes a field 45 that refers to the next object in the list (not shown). The linked list 40 ends with an end object LAST. The object LAST includes a field 47, which has a null value to indicate that the object LAST does not refer to any other objects.

When working with concurrent garbage collection (garbage collection that occurs while an application is running) it is important to avoid situations where objects may not be processed by the garbage collector. During concurrent garbage collection the application continues to execute and can change the connectivity or referencing of objects. This creates a possibility that the write tool 30 could write a reference to a value that has not be processed by the garbage collector 35 into an object that has already been processed by the garbage collector. There is also a possibility that the original reference to an object is deleted, so that the only way of reaching an object that has been created is through an object that has already been processed. When this occurs, that object may never be seen by the garbage collector. The result is that even though a live object is pointing at something, the object will be thought of as dead when sweeping is carried out. To remedy this situation, known as an overwrite, a "trap" is executed. A trap may involve 1) adding a white object into the gray set or 2) re-coloring the black object gray, when writing a white object into a black object.

The write tool 30 accounts for the requirements associated with de-referencing null references and overwrites, and may be implemented with a write barrier check using logic similar to that shown in the pseudo-code below.

```
X→NEXT = Y;      */ The write tool assigns the field 45 in object X a
                 */ value such that it references the object Y
if Y not null then
    if color of Y is white and color of X is black
        then
            call function barrier_trap  */ determine color and check
                                        */ compatibility
```

According to the logic above, the write tool 30 determines whether a white object (unscanned and presumed inactive) is being written into a black object (scanned and active).

The write barrier check function can be represented in assembly language as follows:

```
MOV    [x, #NEXT] y
CMP    y, #0
BEQ    omr */y is null
MOV    a, [x,#COLOR]
```

-continued

| CMP | a,#BLACK |
| BNE | omr */y is not white |
| MOV | a, [y, #COLOR] |
| CMP | a, #WHITE |
| BNE | omr */y is not white |
| CALL | barrier_trap */y non-null and white, x is black |
| | omr: . . . |

According to one embodiment of the invention, the write barrier check described above is modified by replacing the typical null value (i.e., a bit pattern of zeroes) with a pseudo or special object 75 (FIG. 4) in a well-known area of memory (meaning the address is a global constant value in the program and the memory at the address is globally accessible). When checked, the special object 75 always returns the value or color black. Using the special object 75 simplifies the typical write barrier check by eliminating the need to check for the null reference value. In the example noted above, the need to carryout "if Y not null then" is eliminated. During garbage collection, a write barrier check is done on every object field update operation. Thus, the time savings and reduction in resource demands achieved by eliminating checking for the null reference value can be substantial. Reducing demand on computing resources is particularly beneficial in computing environments having limited computing resources and small memory footprints.

It is preferred that the special object be implemented as shown in FIG. 5, which illustrates a second embodiment of the special object, special object 80. Rather than just moving the null reference test into the color operation, the special object (in the embodiment illustrated by the object 80) is implemented such that the first word of the special object, header 82, has a bit pattern that represents black. In particular, a portion of the bits in the first word that makes up the header 82 is used to denote the color black. When designed according to the preferred embodiment, the special object 80 is treated like any other object having a header fixed at start-up (although, as noted, in this case the header contains a bit pattern that represents black). Standard garbage collectors implementing a three-color marking system provide a method to get the color of an object. Thus, the special object 80 imposes no run time costs. All that is required is a simple call to get the bits in the header 82 and return them. Another advantage of the simplifying the write barrier check is that it makes inlining of code easier to achieve. As is known in the art, inlining (the process of rearranging assembly or byte code to include function or method calls directly in line as they occur) improves the execution of a program.

In addition to speeding up write barrier checks, the special object 75/80 can be used when dispatching via an object (that is, calling a subprogram that will have an implementation dependent on the specific type of the object from which the dispatch is made). In order to conduct a dispatch, a check has to be made that the program is not attempting to dispatch via a null object reference. Further, a run time error must be issued if such an attempt is made. By providing a valid dispatch table (an index of the specific subprogram implementations appropriate to the object's type) for the special null object 75/80, where every entry in the table refers to a subprogram that merely raises the run time error unconditionally, all the null object checks can be removed completely from dispatching subprogram calls while still having a run time error raised if an illegal dispatching call occurs.

As can be seen from the above, the invention provides, among other things, a method and system that improves write barrier checking. Various features and advantages of the invention are set forth in the following claims.

What is claimed is:

1. A method of increasing the speed of a write barrier check in a computing environment having memory and a plurality of programming objects, the method comprising:
   creating a globally accessible special object at a valid location in the memory;
   fixing the color of the special object to a predetermined colour; and
   using the valid location of the special object whenever a null value is required.

2. A method as claimed in claim 1, wherein fixing the color of the special object to a predetermined colour includes fixing the color of the special object to black.

3. A method as claimed in claim 2, wherein fixing the color of the special object to black includes setting a bit pattern in a header of the special object to represent black.

4. A method as claimed in claim 2, wherein fixing the color of the special object to black includes creating a method that returns black.

5. A method as claimed in claim 2, further comprising
   checking the color of the plurality of programming objects using a write tool; and
   assigning references to the objects that are not black.

6. A method as claimed in claim 1, wherein using the valid location of the special object whenever a null value is required includes using the valid location in a field of an object.

7. A method as claimed in claim 1, further comprising creating a dispatch table for the special object where every method raises an exception.

8. A method as claimed in claim 2, further comprising
   checking the colour of the plurality of programming objects using a write tool; and
   assigning references to the objects that are not black.

9. A method as claimed in claim 1, further comprising
   calling a first subprogram using a programming object;
   providing a dispatch table for the special object, the dispatch table having a plurality of entries, each entry referencing a subprogram implementation that raises a run time error unconditionally; and
   removing all null object checks from a subprogram call associated with the first subprogram.

10. A write barrier checking apparatus for a computing environment having memory and a plurality of programming objects, the apparatus comprising:
    a globally accessible special object having a fixed predetermined color and a valid location in the memory; and
    a write tool to check the color of the plurality of objects;
    wherein the valid location of the special object is used whenever a null value is required, and the write tool assigns references to the programming objects that are not the predetermined color.

11. An apparatus as claimed in 10, further comprising a linked list with a plurality of fields, wherein at least one of the fields of the linked list includes the valid location of the special object.

12. An apparatus as claimed in claim 10, further comprising a dispatch table for the special object.

13. An apparatus as claimed in claim 10, wherein the predetermined color is black.

14. An apparatus as claimed in claim 13, wherein the special object includes a header having a bit pattern that represents black.

15. An apparatus as claimed in claim 13, wherein the special object includes a method that returns black.

* * * * *